United States Patent
Fan et al.

(10) Patent No.: US 8,208,390 B2
(45) Date of Patent: Jun. 26, 2012

(54) STRUCTURE OF TRANSMISSION PACKET FOR LINK ADAPTATION MECHANISM, AND TRANSMITTING/RECEIVING DEVICE AND METHOD USING THE SAME

(75) Inventors: Guoping Fan, Suwon-si (KR);
Chang-yeul Kwon, Yongin-si (KR);
Se-young Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1023 days.

(21) Appl. No.: 11/723,859

(22) Filed: Mar. 22, 2007

(65) Prior Publication Data
US 2007/0286188 A1    Dec. 13, 2007

Related U.S. Application Data

(60) Provisional application No. 60/811,798, filed on Jun. 8, 2006.

(30) Foreign Application Priority Data

Sep. 18, 2006  (KR) .................. 10-2006-0090271

(51) Int. Cl.
*H04L 12/26*    (2006.01)

(52) U.S. Cl. ........ 370/252; 370/241; 370/253; 370/318; 370/349; 370/352; 370/389; 370/401; 370/464; 370/465; 370/473; 455/67.13; 455/69; 455/522

(58) Field of Classification Search .................. None
See application file for complete search history.

(56) References Cited

U.S. PATENT DOCUMENTS

| | | | |
|---|---|---|---|
| 5,197,067 A * | 3/1993 | Fujimoto et al. ............. | 370/236 |
| 7,295,850 B2 * | 11/2007 | Pedersen ...................... | 455/515 |
| 7,583,693 B2 * | 9/2009 | Olivieri et al. ................ | 370/465 |
| 2003/0198312 A1 | 10/2003 | Budka et al. | |

(Continued)

FOREIGN PATENT DOCUMENTS

EP    1 519 524 A2    3/2005

(Continued)

OTHER PUBLICATIONS

IEEE Std 802.11-1997, Wireless LAN Medium Access Control (MAC) and Physical Layer (PHY) Specifications, Jun. 26, 1997, pp. 34-36.*

(Continued)

*Primary Examiner* — Daniel J Ryman
*Assistant Examiner* — Aixa A Guadalupe
(74) *Attorney, Agent, or Firm* — Sughrue Mion, PLLC

(57) ABSTRACT

The invention relates to a structure of a transmission packet for a link adaptation mechanism that can efficiently transmits/receives uncompressed data using a link adaptation mechanism in a high-frequency wireless communication, and an apparatus and method of transmitting/receiving a packet using the same. According to an aspect of the invention, a structure of a transmission packet for a link adaptation mechanism includes a payload having a plurality of data units obtained through error correction encoding of uncompressed data at a predetermined coding rate, an MAC header being added to the payload and having a link adaptation field and a link adaptation extension field expressing presence/absence of the link adaptation field for transmission/reception of the uncompressed data, and a PHY header being added to the MAC header and including information about the coding rate and information about usability of an unequal error protection mode.

22 Claims, 9 Drawing Sheets

U.S. PATENT DOCUMENTS

| | | |
|---|---|---|
| 2003/0202574 A1 | 10/2003 | Budka et al. |
| 2004/0203981 A1 | 10/2004 | Budka et al. |
| 2004/0246919 A1* | 12/2004 | Larsson ................ 370/328 |
| 2005/0047387 A1 | 3/2005 | Frederiksen et al. |
| 2006/0056443 A1* | 3/2006 | Tao et al. ................ 370/462 |

FOREIGN PATENT DOCUMENTS

| | | |
|---|---|---|
| WO | 2006/046754 A1 | 5/2006 |

OTHER PUBLICATIONS

IEEE Std 802.11a-1999, Wireless LAN MAC and PHY specifications, 1999.*

Enhanced Wireless Consortium, HT MAC Specification, 2005.*

Communication dated Dec. 28, 2011, issued by the State Intellectual Property Office of P.R. China in counterpart Chinese Application No. 200780017283.9.

* cited by examiner

LR : Link Recommendation

LR : Link Recommendation

LA : Link Adaptation

FIG. 9

| HRP mode index | CODING MODE | MODULATION METHOD | CODING RATE | |
|---|---|---|---|---|
| | | | FIRST GROUP [7] [6] [5] [4] | SECOND GROUP [3] [2] [1] [0] |
| 0 | EEP | QPSK | 1/3 | |
| 1 | | QPSK | 2/3 | |
| 2 | | 16-QAM | 2/3 | |
| 3 | UEP | QPSK | 4/7 | 4/5 |
| 4 | | 16-QAM | 4/7 | 4/5 |
| 5 | RETRANSMISSION | QPSK | 1/3 | infinite |
| 6 | | 16-QAM | 1/3 | infinite |

STRUCTURE OF TRANSMISSION PACKET FOR LINK ADAPTATION MECHANISM, AND TRANSMITTING/RECEIVING DEVICE AND METHOD USING THE SAME

CROSS REFERENCE TO RELATED APPLICATION

This application claims priority from Korean Patent Application No. 10-2006-0090271 filed on Sep. 18, 2006 in the Korean Intellectual Property Office, and U.S. Provisional Patent Application No. 60/811,798 filed on Jun. 8, 2006 in the United States Patent and Trademark Office, the disclosures of which are incorporated herein by reference in their entirety.

BACKGROUND OF THE INVENTION

1. Field of the Invention

Apparatuses and methods consistent with the present invention relate to a wireless communication technology, and in particular, to a structure of a transmission packet for a link adaptation mechanism that can efficiently transmits/receives uncompressed data using a link adaptation mechanism in a high-frequency wireless communication, and a transmitting/receiving device and method using the same.

2. Description of the Related Art

With the progress of a wireless network, there has been an increasing demand for the transmission of mass multimedia data and studies for an effective transmission method in a wireless network environment. In addition, a necessity for wireless transmission of a high-quality video, such as a DVD (Digital Video Disk) video, an HDTV (High Definition Television) video, or the like, among various home devices tends to increase.

At present, a task group of IEEE 802.15.3c is considering a technical standard for transmitting mass data in a wireless home network. This standard, called mmWave (Millimeter Wave), uses an electrical wave having a physical wavelength of several millimeters for the sake of the transmission of the mass data (that is, an electrical wave having a frequency 30 GHz to 300 GHz). In the related art, this frequency band is an unlicensed band and is limitedly used, for example, communication carriers, radio astronomy, or vehicle anti-collision.

FIG. 1 is a diagram showing the comparison result of a frequency band between the standard base on IEEE 802.11 and the millimeter wave (mmWave). In IEEE 802.11b or IEEE 802.11g, a carrier frequency is 2.4 GHz, and a channel bandwidth is about 20 MHz. Further, in IEEE 802.11a or IEEE 802.11n, a carrier frequency is 5 GHz, and a channel bandwidth is about 20 MHz. In contrast, in the mmWave, a carrier frequency of 60 GHz is used, and a channel bandwidth is about 0.5 to 2.5 GHz. Accordingly, it can be seen that the mmWave uses much larger carrier frequency and channel bandwidth than the existing standard based on IEEE 802.11. As such, if a high-frequency signal having a wavelength in millimeters (Millimeter Wave) is used, a high transmission rate of several Gbps can be obtained, and the size of an antenna can be set to be not more than 1.5 mm. Then, a single chip including the antenna can be implemented. In addition, an attenuation ratio in air is very high, and thus interference between the apparatuses can be reduced.

In recent years, the transmission of uncompressed audio or video data (hereinafter, referred to as uncompressed data) between wireless apparatuses using a high bandwidth of the millimeter wave has been studied. Compressed AV data is compressed with a partial loss through processes, such as motion compensation, DCT conversion, quantization, variable length coding, and the like, such that portions insensitive to the sense of sight or the sense of hearing is eliminated. In contrast, uncompressed data includes digital values (for example, R, G, and B components) representing pixel components as they are.

Accordingly, while bits in the compressed AV data have similar importance, bits in the uncompressed data have different importance. For example, as shown in FIG. 2, in case of an 8-bit video, one pixel component is expressed by 8 bits. Among these, a bit that expresses the highest order (the highest bit) is a most significant bit (MSB), and a bit that expresses the lowest order (the lowest bit) is a least significant bit (LSB). That is, the bits in one byte data having 8 bits have different importance in restoring a video signal or an audio signal. If an error occurs in a bit having high importance during transmission, the error can be easily detected, compared with a case where an error occurs in a bit having lower importance. Accordingly, bits having high importance need to be protected such that an error does not occur in wireless transmission, compared with bits having lower importance. However, in a known transmission system based on IEEE 802.11, an error correction system and a retransmission system at the same coding rate are used for all bits to be transmitted.

FIG. 3 is a diagram showing the structure a physical layer transmission frame (PHY Protocol Data Unit; PPDU) based on IEEE 802.11a. A PPDU 30 includes a preamble, a signal field, and a data field. The preamble is a signal for synchronization of the PHY hierarchy and channel estimation. The preamble has a plurality of short training signals and long training signals. The signal field includes a RATE field representing a transmission rate, a LENGTH field representing the length of the PPDU, and the like. Typically, the signal field is coded by one symbol. The data field has a PSDU, a tail bit, and a pad bit. Data to be actually transmitted is included in the PSDU.

Meanwhile, between a transmitting device transmitting the uncompressed data and a receiving device receiving the uncompressed data, there exists a link adaptation mechanism that copes with a state of a channel changing every moment. The link adaptation process is performed by adjusting parameters, such as the transmission rate, the size of the transmission frame, and the power of the transmitting/receiving device. However, in the link adaptation mechanism, there is a limit for a bandwidth resource due to the use of a management frame, which causes deterioration of efficiency in data transmission.

SUMMARY OF THE INVENTION

The invention has been finalized in order to solve the above problems, and an aspect of the invention is to provide a transmitting/receiving device and method that uses a new link adaptation mechanism capable of rapidly and efficiently transmitting/receiving uncompressed data in high-frequency wireless communication.

Another aspect of the invention is to provide a structure of a transmission packet for a new link adaptation mechanism.

aspects of the present invention are not limited to those mentioned above, and other aspects of the present invention will be apparently understood by those skilled in the art through the following description.

According to an aspect of the present invention, there is provided a structure of a transmission packet for a link adaptation mechanism, the structure including a payload having a plurality of data units obtained through error correction coding of uncompressed data at a predetermined coding rate, a Media Access Control (MAC) header being added to the payload and having a link adaptation (LA) field and a link adaptation extension (LAE) field expressing presence/absence of the link adaptation field for transmission/reception of the uncompressed data, and a PHY header being added to the MAC header and including information about the coding rate and information about usability of an unequal error protection (UEP) mode.

According to another aspect of the present invention, there is provided a transmitting device using a link adaptation mechanism, the transmitting device including a unit generating a transmission packet for transmitting uncompressed data, and a unit transmitting the generated transmission packet. The transmission packet includes a payload having a plurality of data units obtained through error correction coding of the uncompressed data at a predetermined coding rate, an MAC header being added to the payload and having a link adaptation field and a link adaptation extension field expressing presence/absence of the link adaptation field for transmission/reception of the uncompressed data, and a PHY header being added to the MAC header and including information about the coding rate and information about usability of an unequal error protection (UEP) mode.

According to still another aspect of the present invention, there is provided a receiving device using a link adaptation mechanism, the receiving device including a unit receiving a transmission packet including the uncompressed data, and a unit restoring AV data from the received transmission packet. The transmission packet includes a payload having a plurality of data units obtained through error correction coding of the uncompressed data at a predetermined coding rate, an MAC header being added to the payload and having a link adaptation field and a link adaptation extension field expressing presence/absence of the link adaptation field for transmission/reception of the uncompressed data, and a PHY header being added to the MAC header and including information about the coding rate and information about usability of an unequal error protection (UEP) mode.

According to yet still another aspect of the present invention, there is provided a transmitting/receiving method using a link adaptation mechanism, the method including assessing a state of a channel transmitting/receiving a transmission packet including uncompressed data and quality of the transmission packet, recommending a transmission mode suitable for a current channel state using the assessment result, and adjusting information constituting the recommended transmission mode. The recommending includes causing a transmitting device to transmit a transmission packet including a link recommendation request (LR REQ) component to a receiving device, and causing the receiving device to transmit a transmission packet including a link recommendation response (LR RES) component corresponding to the link recommendation request to the transmitting device and to reply to the link recommendation request.

BRIEF DESCRIPTION OF THE DRAWINGS

The above and other features and aspects of the present invention will become more apparent by describing in detail exemplary embodiments thereof with reference to the attached drawings in which:

FIG. 3 is a diagram showing the structure of a PPDU based on IEEE 802.11a;

FIG. 9 is a diagram showing a high rate PHY (HRP) mode index table according to an exemplary embodiment of the invention;

DESCRIPTION OF THE EXEMPLARY EMBODIMENTS

Figure 1:
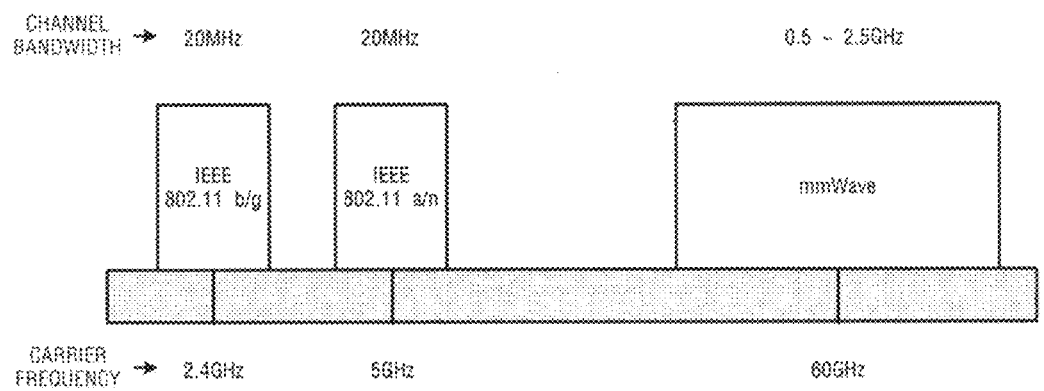
FIG. 1 is a diagram showing the comparison result of a frequency band between a standard base on IEEE 802.11 and a millimeter wave (mmWave)
Figure 2:
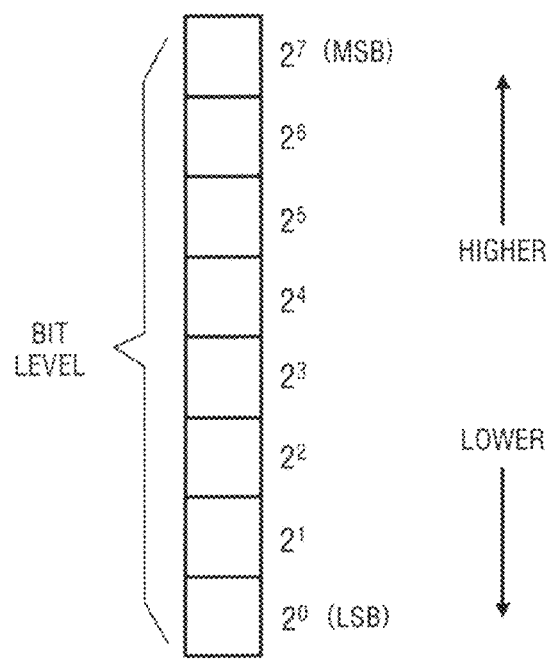
FIG. 2 is a diagram showing a case where one pixel component has a plurality of bit levels.
Figure 3:
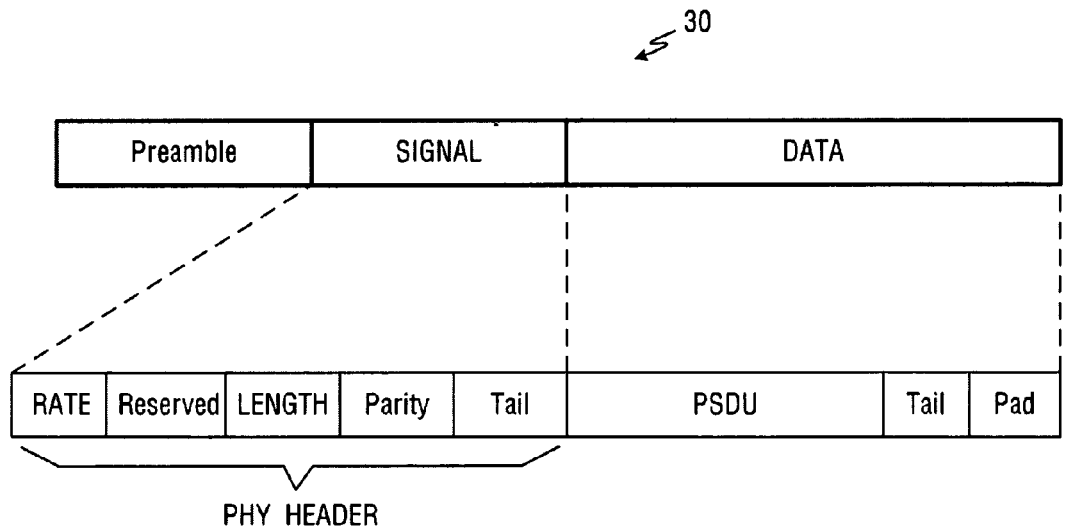

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, a structure of a transmission packet for a link adaptation mechanism, and transmitting/receiving device and method using the same will be described in detail by way of exemplary embodiments of the invention with reference to block diagrams or flowcharts.

Figure 4:
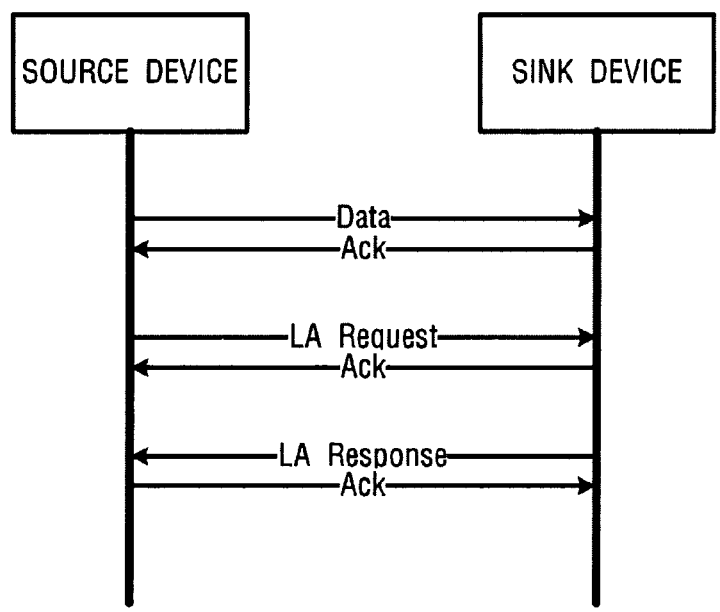
FIG. 4 is a diagram showing a link adaptation mechanism according to the related art.

FIG. 4 is a diagram showing a link adaptation mechanism according to the related art. In the link adaptation mechanism, a source device and a sink device exchange request and response messages about channel information using a specific management frame. A detailed description is as follows.

First, the source device sends a series of data frames to the sink device, and, if necessary, sends a link adaptation request (LA REQ) frame to the sink device and requests the sink device for a reply of channel information. The sink device sends an Ack frame for the LA REQ frame, and then transmits a link adaptation response (LA RES) frame to the source device. The source device that receives the LA RES frame sends the Ack frame to the sink device again, and then data exchange ends. However, in the above-described link adaptation mechanism, an access to the channel is not easy. Further, since an exchange sequence of the REQ-ACK frame and an exchange sequence of the RES-ACK frame are separated, it takes much time to transmit the REQ frame and receive the RES frame. In order to solve this problem, the invention suggests a new link adaptation mechanism that can unify the exchange sequences of the frames so as to transmit the REQ components together when general data is transmitted, and reply the RES components together when the ACK frame is sent.

Figure 5:
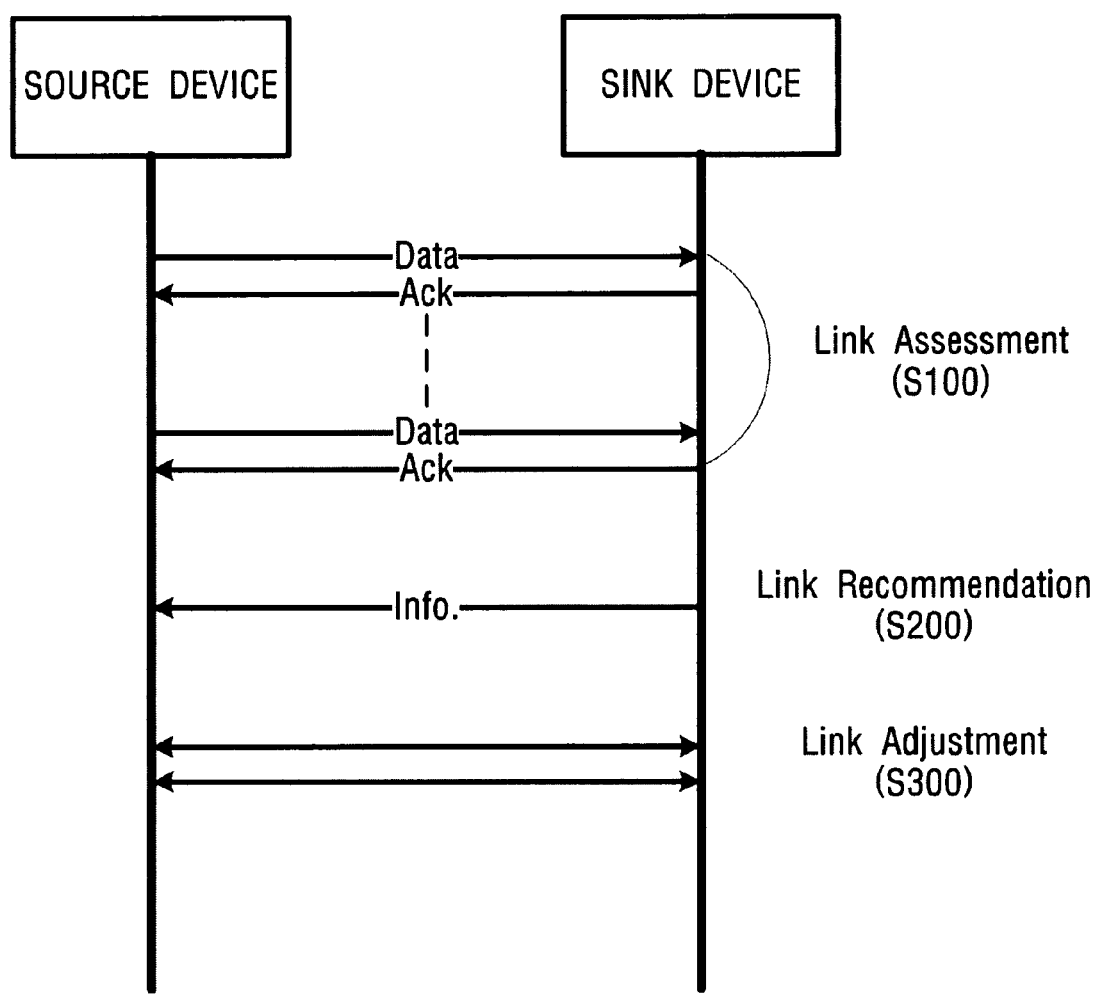
FIG. 5 is a diagram showing a link adaptation mechanism according to an exemplary embodiment of the invention.

FIG. 5 is a diagram showing a link adaptation mechanism according to an exemplary embodiment of the invention. The link adaptation mechanism has three steps, as shown in FIG. 5.

First, a link assessment (S100) will be described.

A source device transmits data to a sink device. Then, the sink device that receives the data assesses the state of a channel and quality of a transmission packet, and calculates setting information of an optimum transmission mode for the current channel state using the assessment result (S100). The setting information of the transmission mode includes information about an unequal error protection (UEP) mode, information about a PHY mode, and information about a recommendation mask of link adjustment to be used to determine whether or not to execute a link adjustment step described below.

Next, a link recommendation (S200) will be described. The link recommendation step is a step of recommending a link by causing the sink device to transmit a packet including the calculated transmission mode to the source device. Through the link recommendation step, the source device obtains the information about the state of the channel and the setting information of the transmission mode. In order to reduce a cycle of the link recommendation step and realize fast data transmission, instead of using the management frame, a link adaptation field and a link adaptation extension (hereinafter, referred to as LAE) field expressing presence/absence of the link adaptation field are added to an MAC header. The link recommendation step is divided into an active mode and a passive mode that will be described with reference to FIGS. 6A and 6B.

Figure 6A:
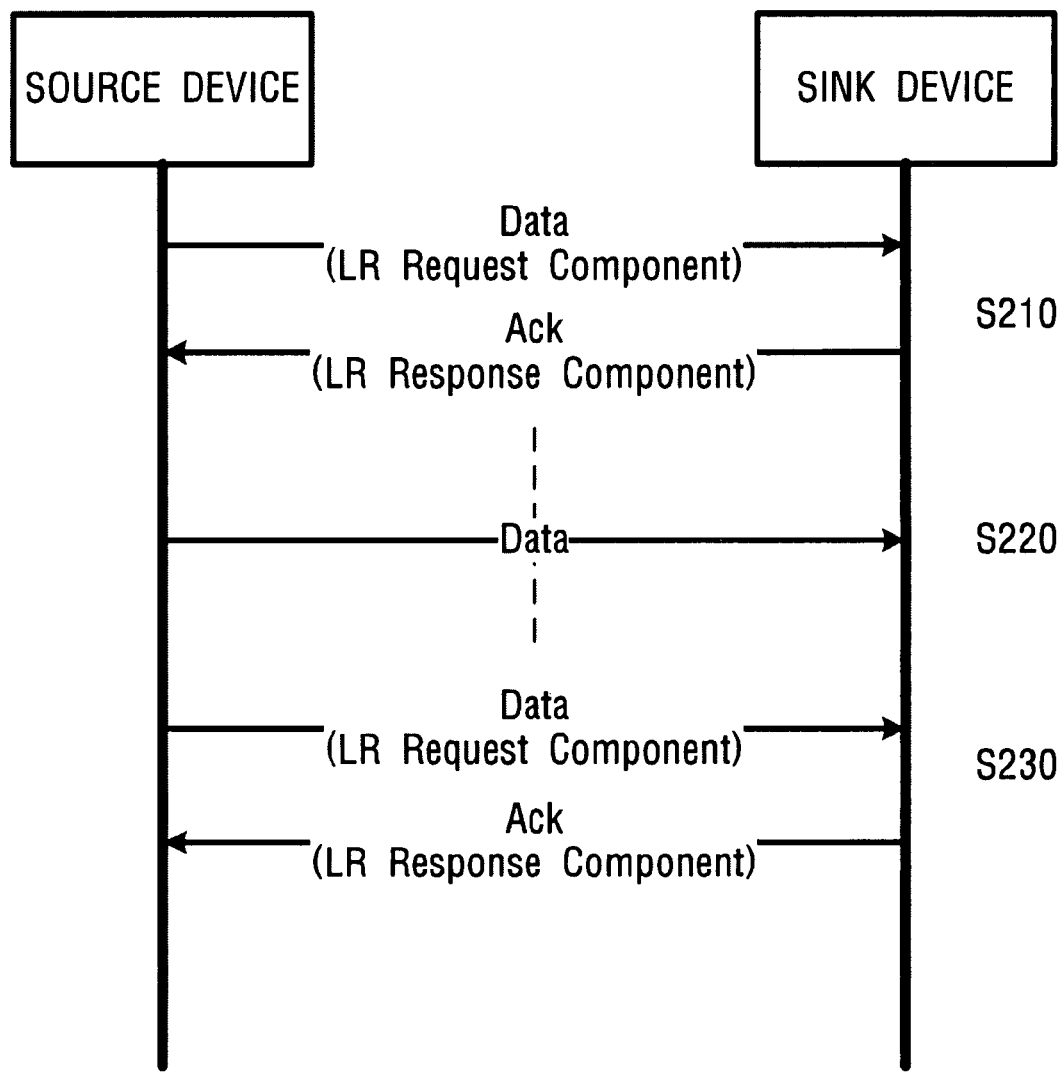
FIG. 6A is a diagram showing an active link adaptation mechanism among the link adaptation mechanisms according to an exemplary embodiment of the invention.
Figure 6B:
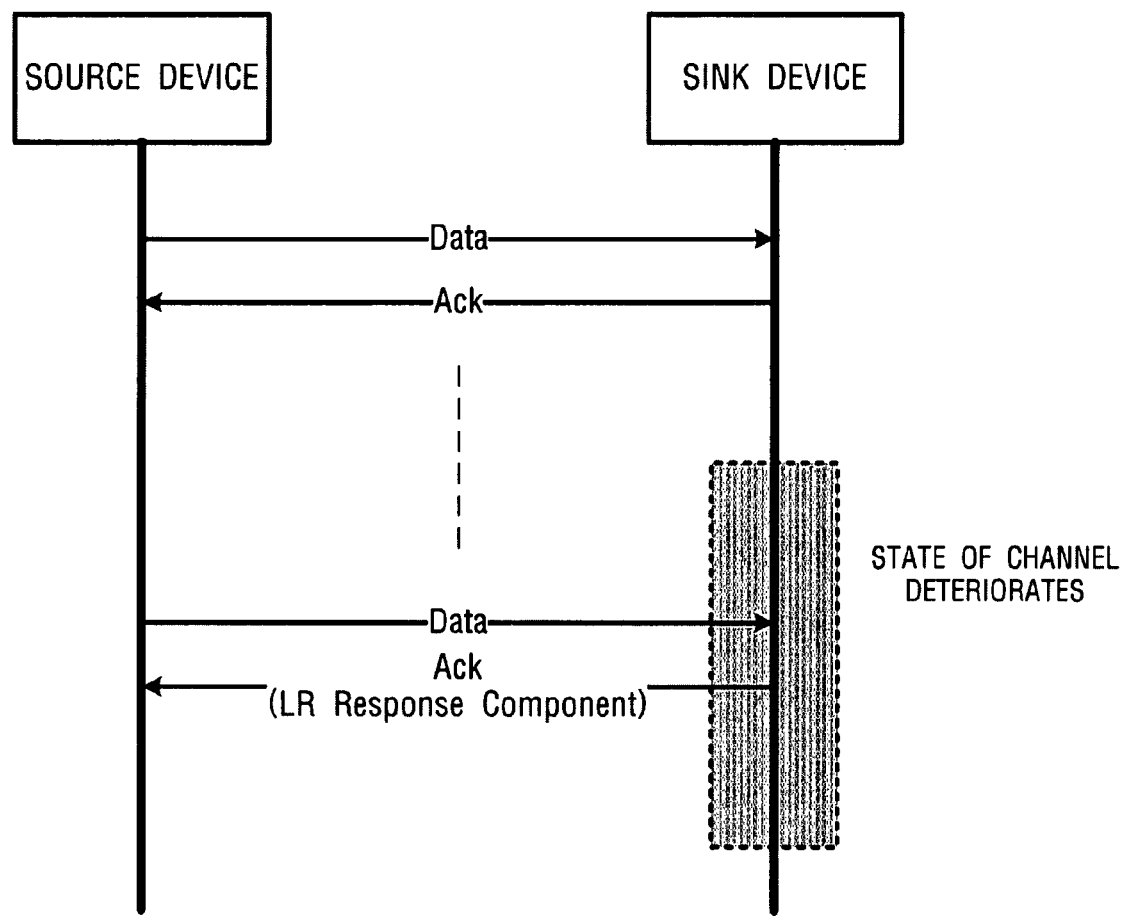
FIG. 6B is a diagram showing a passive link adaptation mechanism among the link adaptation mechanisms according to an exemplary embodiment of the invention.

FIG. 6A is a diagram showing an active link adaptation mechanism among the link adaptation mechanisms according to the exemplary embodiment of the invention. FIG. 6B is a diagram showing a passive link adaptation mechanism among the link adaptation mechanisms according to the exemplary embodiment of the invention.

First, referring to FIG. 6A, if the source device sends data recorded with an LR request component to the sink device, the sink device records data recorded with an LR response component in an ACK message and replies the ACK message (S210). Through the data exchange, the source device acquires the information about the state of the channel and quality of the signal from the sink device in real time. The source device transmits data on the basis of the acquired information (S220). When the state of the channel changes or quality of the signal changes, the source device performs a step of sending the data recorded with the LR Request Component to the sink device again, and the sink device performs a step of recording the data recorded with the LR response component in the ACK and replying the ACK message again (S230).

Unlike the active mode of FIG. 6A, in a passive mode shown in FIG. 6B, with no link recommendation request of the source device, the sink device sends the data recorded with the link recommendation response component itself. In the passive mode, the sink device judges of itself whether or not to provide the information about the state of the channel or quality of the signal or when the information is provided. In the passive mode, the link recommendation step can be regarded as a step of recommending the setting information of the transmission mode according to its own judgment when the state of the channel deteriorates to an extent that data transmission/reception is not appropriate.

The active mode and the passive mode are applied separately, but both modes may be applied together according to the state of the channel. Further, the link adaptation extension field needs to have a value '1' such that the link adaptation extension component recorded in a MAC header extension field constituting the MAC header is activated. This will be described with reference to FIG. 8.

Returning to FIG. 5, the source device adjusts parameter information in the setting information of the transmission mode recommended by the sink device, thereby executing a link adjustment step (S300). At this step, adjustable parameter information includes UEP information, beam searching information, and information about adjustment of an HRP mode and a low rate PHY (LRP) mode. That is, if the source device receives the data (setting information) recorded with the LR Response Component from the sink device, on the basis of the received setting information and the judgment of the source device about the current state of the channel, it is determined whether or not to execute the link adjustment step.

Meanwhile, in the above-described link adaptation mechanism, the source device and the sink device are terms that are used to give the description paying focus on the data flow. The source device may function as a receiving device, in addition to a general transmitting device. Similarly, the sink device may function as a transmitting device and a receiving device.

Figure 7:
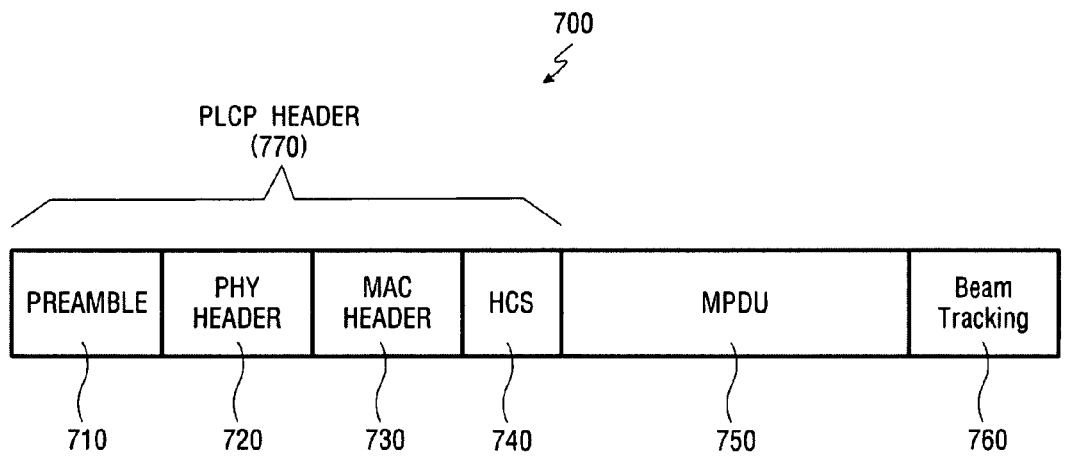
FIG. 7 is a diagram showing the structure of a transmission packet according to an exemplary embodiment of the invention.

FIG. 7 is a diagram showing a transmission packet according to an exemplary embodiment of the invention. A transmission packet 700 broadly includes a PLCP (Physical Layer Convergence Protocol) header 770, an MPDU field 750, and a beam tracking field 760. The PLCP header 770 is subdivided into a preamble 710, a PHY header 720, a MAC header 730, and an HCS field 740.

The preamble 710 is a signal for synchronization of a PHY hierarchy and channel estimation. Typically, the preamble 710 has a plurality of short training signals and long training signals.

The PHY header 720 is a region that is generated on the basis of information to be used in the PHY hierarchy, and the MAC header 730 is a region that is generated on the basis of information to be used in an MAC hierarchy. In addition, the HCS (Header Check Sequence) field 740 is a region that is used to examine whether or not an error occurs in the PLCP header 770, that is, an error occurs in the header.

The MPDU (MAC Protocol Data Unit) field 750 is a region where data to be actually transmitted, that is, uncompressed data subject to error correction coding at a predetermined coding rate is recorded.

The beam tracking field 760 is a region where additional information for beam steering is recorded. Beam steering means setting directionality of an antenna according to a reception direction of a radio signal having directionality. For example, a receiving device that receives the radio signal having directionality receives the same radio signals having different phases from an array antenna, calculates DOA (Direction Of Arrival) from the sum of the received signals through the discrete Fourier transform, and establishes the directionality of the receiving signal through the combination of the amplitude and phase, thereby optimizing the array antenna in the corresponding direction. To this end, in the beam tracking field 760, information that is referred to when the directionality of the antenna in the receiving device is established is recorded.

Figure 8:
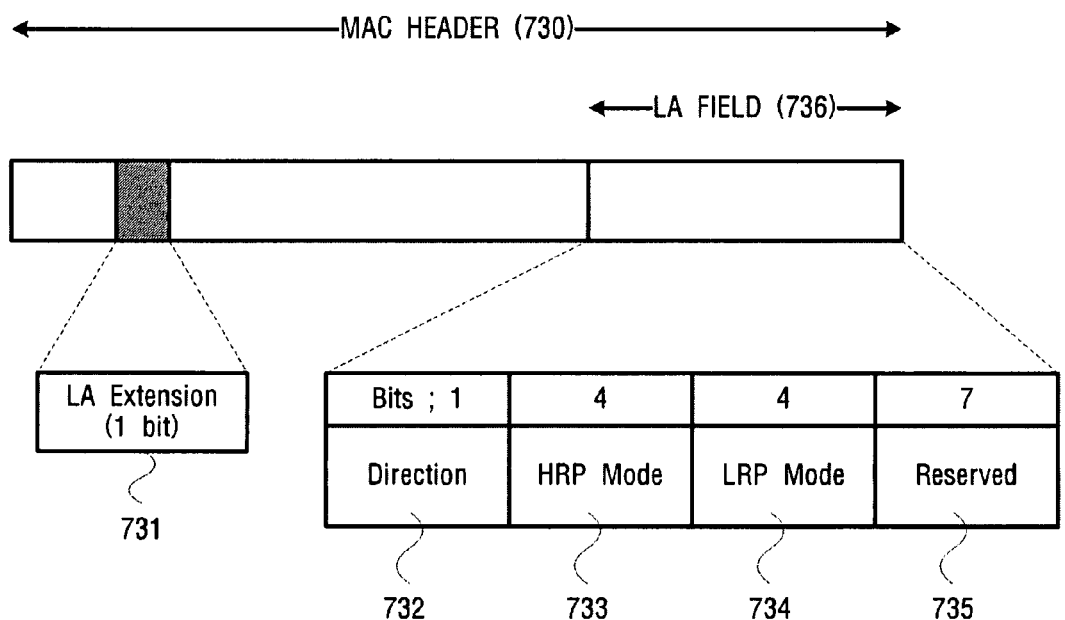
FIG. 8 is a diagram showing an MAC header among the structures of the transmission packet according to an exemplary embodiment of the invention.

In the above-described structure of the transmission packet, the function of the MAC header in the exemplary embodiment of the invention will be described in detail with reference to FIG. 8. FIG. 8 is a diagram showing the structure of the MAC header 730 in the structure of the transmission packet according to an exemplary embodiment of the invention. As shown in FIG. 8, in the MAC header 730, in order to execute the link adaptation mechanism, a link adaptation (LA) field 736 and a link adaptation extension (LAE) field 731 expressing presence/absence of the LA field 736 are recorded.

The LAE field 731 has a value '1' when the LA field 736 is activated, and has a value '0' when the LA field 736 is inactivated. When the link adaptation field 736 is activated, the link adaptation field has four subfields. That is, the link adaptation field 736 includes a direction field 732 expressing information about a transmission direction of the transmission packet, an HRP mode field 733 where a high rate Phy mode index is recorded, an LRP mode field 734 where a low rate Phy mode index is recorded, and a reserved field 735 for a future preliminary use. As regards the lengths of the fields, the direction field 732 is 1 bit, the HRP mode field 733 and the LRP mode field 734 are 4 bits, respectively, and the reserved field 735 is 7 bits. Accordingly, it can be seen that the link adaptation field 736 is 16 bits.

The direction field 732 has 1 bit, and thus it may have a value 0 or 1. When the direction field 732 has the value 0, it means that the source device sends the data recorded with the link recommendation request component to the sink device. Further, when the direction field 732 has the value 1, it means that the sink device sends the data recorded with the link recommendation response component to the source device.

Meanwhile, the link adaptation mechanism has two logic channels; a high rate PHY (hereinafter, referred to as HRP) channel having a transmission rate of approximately 30 Gbps and a low rate PHY (hereinafter, referred to as LRP) channel having a transmission rate of approximately 40 Mbps. Accordingly, it can be seen that, in the subfields constituting the LA field 736, the HRP mode field 733 and the LRP mode field 734 are dividedly recorded. In particular, in the HRP mode field 733, mode indexes representing combinations of information about a coding mode, information about a modulation system, information about the number of bit levels in a transmission data unit, and information about a coding rate of the bit levels are recorded. Among the mode indexes, one index number may be selected. If one of the index numbers is selected, the combination of the information corresponding to the selected index number serves as setting information of the new transmission mode. An example of a table representing the combinations of the information is shown in FIG. 9.

FIG. 9 is a diagram showing an HRP mode index table according to an exemplary embodiment of the invention.

Referring to the table of FIG. 9, the HRP mode index is defined to have a value ranging from 0 to 6. However, this is just an example. In case of 4 bits, the HRP mode index may be defined to have a value ranging from 0 to 15. Although fields representing items, such as grouping information (the number of bit levels in one group), a coding rate, a modulation system, and the like, are individually arranged, when the mode index is used, a plurality of item combinations can be represented by one index. The table in FIG. 9 needs to be decided in advance between the source device and the sink device or needs to be transmitted from the source device to the sink device.

It can be seen that EEP (Equal Error Protection) is applied when the HRP mode index ranges from 0 to 2, while UEP is applied when the HRP mode index ranges from 3 to 4. As regards the modulation system, QPSK is applied when the HRP mode index is 3, while 16-QAM is applied when the HRP mode index is 4. At this time, as, the coding rate, a comparatively low value, for example, 4/7, is applied with respect to the higher bit levels, while a comparatively high value, for example, 4/5, is applied with respect to the lower bit levels. In this case, however, since an average coding rate with respect to all the bit levels becomes 2/3, it can be seen that the size of data to be transmitted is the same as the HRP mode index is 1 or 2. Meanwhile, when the HRP mode index is 5 or 6, a transmission error occurs, and retransmission is performed. Upon the retransmission, the higher bit levels having comparatively high importance are retransmitted at a coding rate 1/3, and the lower bit levels having comparatively low importance are not transmitted (a coding rate is infinite).

Figure 10:
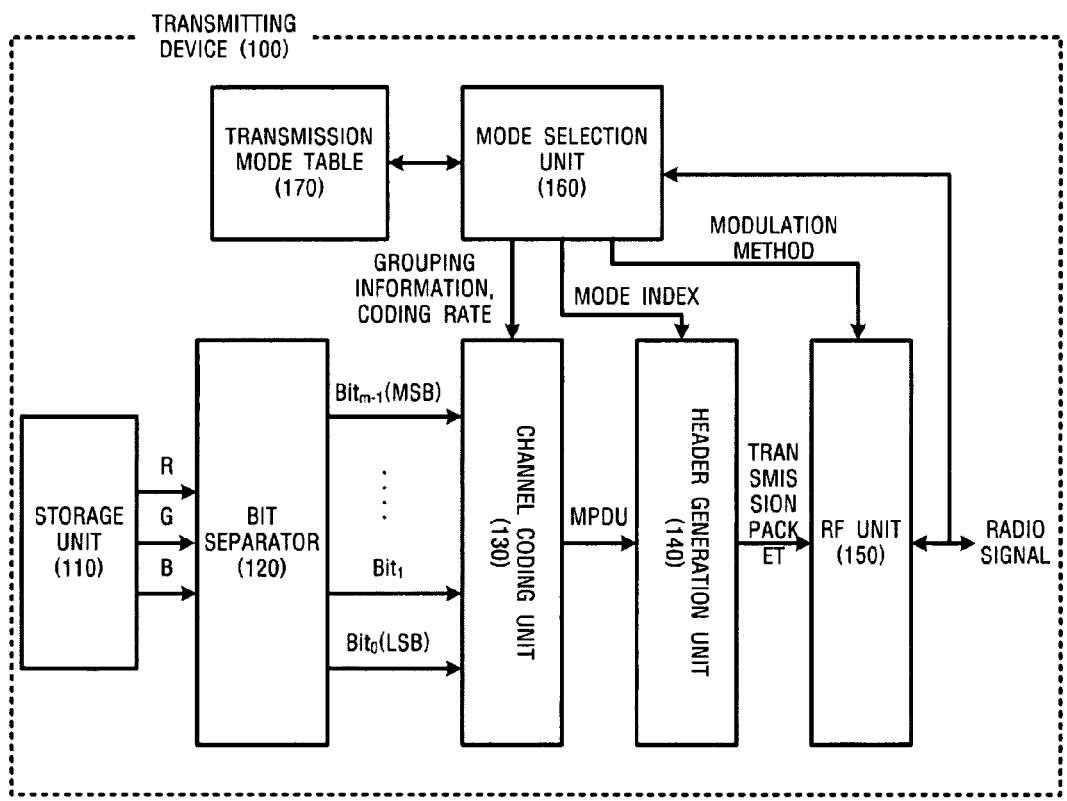
FIG. 10 is a diagram showing the configuration of a transmitting device according to an exemplary embodiment of the invention.

FIG. 10 is a diagram showing the configuration of a transmitting device 100 according to an exemplary embodiment of the invention. The transmitting device 100 includes a storage unit 110, a bit separator 120, a channel coding unit 130, a header addition unit 140, an RF (Radio Frequency) unit 150, a mode selection unit 160, and a transmission mode table 170.

The storage unit 110 stores the uncompressed data. When the AV data is video data, subpixel values of the individual pixels are stored. The subpixel values may be stored to have various values according to a color space to be used (for example, a RGB color space or a YCbCr color space). In the invention, it is assumed that each pixel has three subpixels of R (Red), G (Green), and B (Blue) according to the RGB color space. Of course, when video data is gray, since a subpixel component is just one, one subpixel can form a pixel as it is. Alternatively, two or four subpixel components may form one pixel.

The bit separator 120 separates the subpixel value from the storage unit 110 from a high-order (high bit level) bit to a low-order (low bit level) bit. For example, in case of an 8-bit video, the order ranges from $2^7$ to $2^0$, the subpixel value can be separated into 8 bits in total. Here, m represents the number of bits of the pixel, and $Bit_{m-1}$ represents a (m−1)-order bit. Such a bit separation step is independently performed for each subpixel.

The channel coding unit 130 performs error correction coding on the separated bits at an appropriate coding rate according to the importance, thereby generating a payload. Such error correction coding broadly includes block coding and convolution coding. Block coding (for example, Reed-Solomon coding) performs coding and decoding data in terms of a predetermined number of blocks. Convolution coding performs coding through comparison previous data and current data using a memory having a predetermined length.

Error correction coding includes a step of converting k bits to be input into an n-bit codeword. At this time, a coding rate is represented by "k/n". Since a codeword having bits larger than the input bits is coded as the coding rate is low, an error correction probability increases. The payload, that is, the MPDU 750 is formed by collecting the results of error correction coding.

The header generation unit 140 generates the preamble 710, the PHY header 720, and the MAC header 730 and prepends them to the MPDU 750 having a plurality of coded TDUs, thereby generating the transmission packet 700 shown in FIG. 7. At this time, the HRP mode index is recorded in the PHY header 720. As described above, the HRP mode index represents the combination of the grouping information (a grouping system of the TDUs), the coding rate, the modulation system, and the like, and is provided by the mode selection unit 160.

The RF unit 150 modulates the transmission packet from the header generation unit 140 using the modulation system from the mode selection unit 160 and transmits the modulated transmission packet through the antenna.

The mode selection unit 160 selects one mode index in the transmission mode table 170, like the table of FIG. 9, on the basis of the transmission environment of the transmission-packet. The mode selection unit 160 provides grouping information and information about a coding rate according to the selected mode index to the channel coding unit 130 and provides a modulation system according to the mode index to the RF unit 150.

Figure 11:
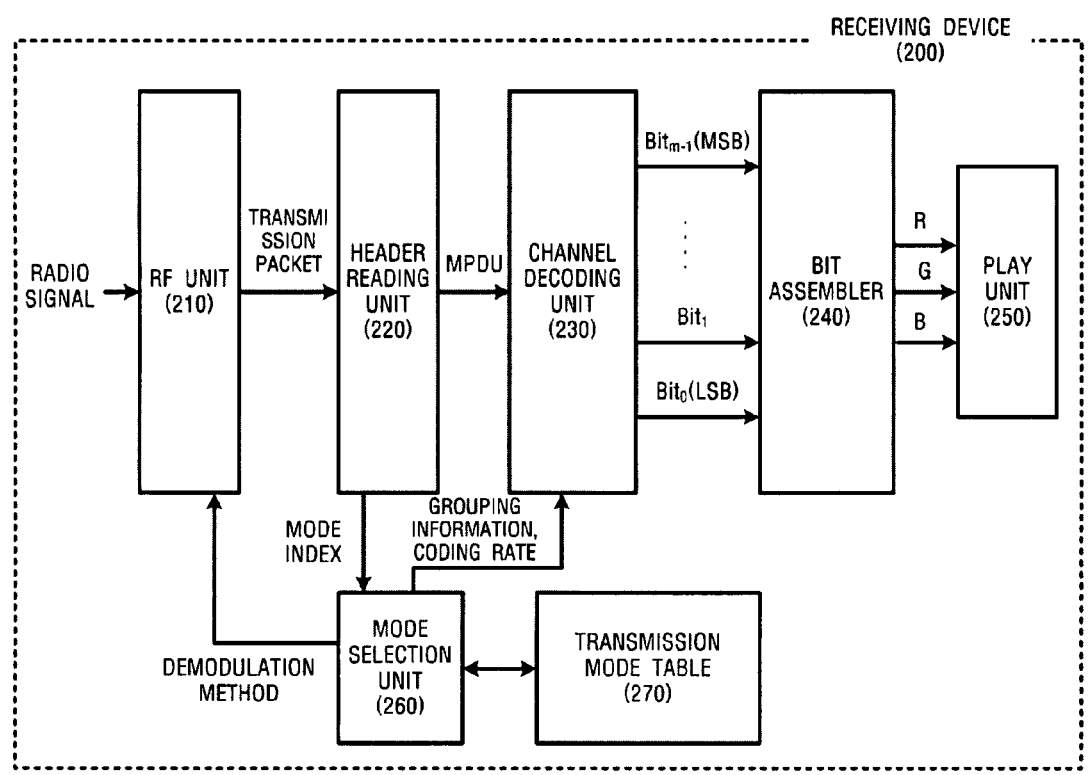
FIG. 11 is a diagram showing the configuration of a receiving device according to an exemplary embodiment of the invention.

FIG. 11 is a diagram showing the configuration of a receiving device 200 according to an exemplary embodiment of the invention. The receiving device 200 includes an RF unit 210, a header reading unit 220, a channel decoding unit 230, a bit assembler 240, a play unit 250, a mode selection unit 260, and a transmission mode table 270.

The RF unit 210 demodulates the received radio signal and restores the transmission packet. A demodulation method to be applied to demodulation may be provided from the mode selection unit 260.

The header reading unit 220 reads the PHY header and the MAC header added by the header generation unit 140 of FIG. 10, and provides the MPDU from which the headers are eliminated, that is, the payload to the channel decoding unit 230. At this time, the header reading unit 220 reads the mode index recorded in the PHY header 720 and provides the read mode index to the mode selection unit 260.

The mode selection unit 260 selects the grouping information, the coding rate, and the demodulation method corresponding to the mode index from the header reading unit 220 with reference to the transmission mode table 270. Then, the mode selection unit 260 provides the modulation system to the RF unit 210, and provides the grouping information and the coding rate to the channel decoding unit 230. The RF unit 210 demodulates the radio signal according to the demodulation system.

The channel decoding unit 230 grasps the kind of TDU constituting the current MPDU through the grouping information (the number of bit levels in the TDU) from the mode selection unit 260, and performs error correction decoding at a coding rate applied to the corresponding TDU. The coding rate is also provided from the mode selection unit 260. Error correction decoding is an inverse step of error correction coding in the channel coding unit 150, and includes a step of restoring k-bit original data from the n-bit codeword.

The bit assembler 240 assembles the bits by output bit levels (from the highest level to the lowest level so as to restore the individual subpixel components. The individual subpixel components (for example, R, G, and B components) restored by the bit assembler 240 are supplied to the play unit 250.

When the subpixel components, that is, pixel data is collected and one video frame is formed, the play unit 270 displays the video frame on a display device, such as CRT (Cathode Ray Tube), LCD (Liquid Crystal Display), PDP (Plasma Display Panel), or the like, according to a play synchronization signal.

Although the video data is used as the uncompressed data in the above description, it can be fully understood by those skilled in the art that the same method can be applied to uncompressed audio data, such as wave files or the like.

The individual parts of FIG. 10 to FIG. 11 may be implemented by software, such as tasks, classes, subroutines, processes, objects, execution threads, and programs, or hardware, such as a field-programmable gate array (FPGA) or an application-specific integrated circuit (ASIC). Further, the individual parts may be implemented by a combination of software and hardware. The parts may be included in a computer-readable storage medium or partially separated into a plurality of computers.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects. The scope of the present invention is defined by the appended claims rather than by the description preceding them, and all changers and modifications that fall within meets and bounds of the claims, or equivalents of such meets and bounds are therefore intended to be embraced by the claims.

According to an exemplary embodiment of the invention, it is possible to provide a new link adaptation mechanism that can rapidly and efficiently transmit and receive uncompressed data in a high-frequency wireless communication.

Effects of the present invention are not limited to those mentioned above, and other effects of the present invention will be apparently understood by those skilled in the art through the appended claims.

What is claimed is:

1. A non-transitory computer-readable storage medium, having embodied thereon a program which, when executed by a computer, causes the computer to transmit a transmission packet for a link adaptation mechanism that transmits uncompressed data, the method comprising:
   transmitting the transmission packet,
   wherein the transmission packet comprises:
      a payload comprising a plurality of data units obtained through error correction coding of the uncompressed data at a predetermined coding rate;
      a media access control (MAC) header comprising a link adaptation field and a link adaptation extension field expressing presence or absence of the link adaptation field for transmission or reception of the uncompressed data; and
      a physical layer (PHY) header comprising information about the predetermined coding rate and information about usability of an unequal error protection mod,
   wherein the link adaptation field comprises a direction field expressing information about a transmission direction of the transmission packet, a high rate PHY (HRP) mode field where a high rate Phy mode index is recorded, a low rate PHY (LRP) mode field where a low rate Phy mode index is recorded, and a reserved field for a future preliminary use.

2. The non-transitory computer-readable storage medium of claim 1, wherein the link adaptation extension field has a value 1 when the link adaptation field is activated, and has a value 0 when the link adaptation field is inactivated.

3. The non-transitory computer-readable storage medium of claim 1, wherein the direction field is 1 bit, the HRP mode field and the LRP mode field are 4 bits, respectively, and the reserved field is 7 bits.

4. The non-transitory computer-readable storage medium of claim 1, wherein the direction field has a value 0 in case of a link recommendation request mode in which a transmitting device transmitting the transmission packet requests a receiving device receiving the transmission packet to recommend a link, and has a value 1 in case of a link recommendation response mode in which the receiving device responds to the transmitting device for the link recommendation request.

5. The non-transitory computer-readable storage medium of claim 4, wherein, when the direction field has a value 1, in the HRP mode field, a mode index representing a combination information about a coding mode, information about a modulation method, information about the number of bit levels in the transmission data unit, and information about a coding rate of the bit levels is recorded.

6. A transmitting device using a link adaptation mechanism, the device comprising:
   a unit which generates a transmission packet for transmitting uncompressed data; and
   an RF unit which transmits the generated transmission packet,
   wherein the transmission packet comprises
   a payload comprising a plurality of data units obtained through error correction coding of the uncompressed data at a predetermined coding rate,
   a media access control (MAC) header comprising a link adaptation field and a link adaptation extension field expressing presence or absence of the link adaptation field for transmission or reception of the uncompressed data, and
   a physical layer (PHY) header comprising information about the predetermined coding rate and information about usability of an unequal error protection mod;
   wherein the link adaptation field comprises a direction field expressing information about a transmission direction of the transmission packet, a high rate PHY (HRP) mode field where a high rate Phy mode index is recorded, a low rate PHY (LRP) mode field where a low rate Phy mode index is recorded, and a reserved field for a future preliminary use.

7. The device of claim 6, wherein the link adaptation extension field has a value 1 when the link adaptation field is activated, and has a value 0 when the link adaptation field is inactivated.

8. The device of claim 6, wherein the direction field is 1 bit, the HRP mode field and the LRP mode field are 4 bits, respectively, and the reserved field is 7 bits.

9. The device of claim 6, wherein the direction field has a value 0 in case of a link recommendation request mode in which a transmitting device transmitting the transmission packet requests a receiving device receiving the transmission packet to recommend a link, and has a value 1 in case of a link recommendation response mode in which the receiving device responds to the transmitting device for the link recommendation request.

10. The device of claim 9, wherein, when the direction field has a value 1, in the HRP mode field, a mode index representing a combination information about a coding mode, information about a modulation method, information about the number of bit levels in the transmission data unit, and information about a coding rate of the bit levels is recorded.

11. A receiving device using a link adaptation mechanism, the device comprising:
   an RF unit receiving a transmission packet including the uncompressed data; and
   a unit restoring AV data from the received transmission packet,
   wherein the transmission packet comprises
   a payload comprising a plurality of data units obtained through error correction coding of the uncompressed data at a predetermined coding rate,
   a media access control (MAC) header comprising a link adaptation field and a link adaptation extension field expressing presence or absence of the link adaptation field for transmission or reception of the uncompressed data, and
   a physical layer (PHY) header comprising information about the predetermined coding rate and information about usability of an unequal error protection (UEP) mode,
   wherein the link adaptation field comprises a direction field expressing information about a transmission direction of the transmission packet, a high rate PHY (HRP) mode field where a high rate Phy mode index is recorded, a low rate PHY (LRP) mode field where a low rate Phy mode index is recorded, and a reserved field for a future preliminary use.

12. The device of claim 11, wherein the link adaptation extension field has a value 1 when the link adaptation field is activated, and has a value 0 when the link adaptation field is inactivated.

13. The device of claim 11, wherein the direction field is 1 bit, the HRP mode field and the LRP mode field are 4 bits, respectively, and the reserved field is 7 bits.

14. The device of claim 11, wherein the direction field has a value 0 in case of a link recommendation request mode in which a transmitting device transmitting the transmission packet requests a receiving device receiving the transmission packet to recommend a link, and has a value 1 in case of a link recommendation response mode in which the receiving device responds to the transmitting device for the link recommendation request.

15. The device of claim 14, wherein, when the direction field has a value 1, in the HRP mode field, a mode index representing a combination information about a coding mode, information about a modulation method, information about the number of bit levels in the transmission data unit, and information about a coding rate of the bit levels is recorded.

16. A transmitting/receiving method using a link adaptation mechanism, the method comprising: assessing a state of a channel transmitting or receiving a transmission packet including uncompressed data and quality of the transmission packet; recommending a transmission mode suitable for a current channel state in accordance with the assessed state; and adjusting information constituting the recommended transmission mode, wherein the recommending comprises: transmitting, by a transmitting device, a transmission packet comprising a link recommendation request (LR REQ) component to a receiving device, and transmitting, by the receiving device, a transmission packet comprising a link recommendation response (LR RES) component corresponding to the link recommendation request, to the transmitting device;
   wherein the link recommendation request component and the link recommendation response component constitute a link adaptation field in a media access control (MAC) header of the transmission packet; wherein the link adaptation field comprises a direction field expressing information about a transmission direction of the transmission packet, a high rate PHY (HRP) mode field where a high rate PHY mode index is recorded, a low rate PHY (LRP) mode field where a low rate PHY mode index is recorded, and a reserved field for a future preliminary use.

17. The method of claim 16, wherein the direction field is 1 bit, the HRP mode field and the LRP mode field are 4 bits, respectively, and the reserved field is 7 bits.

18. The method of claim 16, wherein the direction field has a value 0 when the transmitting device transmits the transmission packet including the link recommendation request component to the receiving device, and has a value 1 when the receiving device transmits the transmission packet including the link recommendation response component to the transmitting device.

19. The method of claim 18, wherein, when the direction field has a value 1, in the HRP mode field, a mode index representing a combination information about a coding mode, information about a modulation method, information about the number of bit levels in the transmission data unit, and information about a coding rate of the bit levels is recorded.

20. The method of claim 16, wherein, when the state of a channel transmitting and receiving the transmission packet deteriorates, the recommending further comprises causing the receiving device to transmit the transmission packet including the link recommendation response component to the transmitting device with no link recommendation request of the transmitting device.

21. The method of claim 16, wherein the transmission packet comprising the LR REQ is a first transmission packet, the first transmission packet comprising the uncompressed data and the LR REQ component, and wherein the transmission packet comprising the LR RES component is a second transmission packet, and the transmitting, by the receiving device, comprises transmitting, in response to receiving the first transmission packet, the second transmission packet to the transmitting device, the second transmission packet acknowledging receipt of the first transmission packet, and the second transmission packet comprising the LR RES component corresponding to the LR REQ.

22. The method of claim 16, wherein the transmission packet comprising the LR RES component is an acknowledgement packet that includes the LR RES component.

* * * * *